United States Patent
Kwon et al.

(10) Patent No.: US 7,324,578 B2
(45) Date of Patent: Jan. 29, 2008

(54) METHOD AND APPARATUS FOR TRANSMITTING AND RECEIVING INFORMATION ABOUT SPREADING CODES USED FOR A PACKET DATA CHANNEL IN A COMMUNICATION SYSTEM

(75) Inventors: Hwan-Joon Kwon, Seoul (KR); Ho-Kyu Choi, Songnam-shi (KR); Dong-Hee Kim, Seoul (KR); Youn-Sun Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 1091 days.

(21) Appl. No.: 10/358,906

(22) Filed: Feb. 5, 2003

(65) Prior Publication Data

US 2003/0147454 A1 Aug. 7, 2003

(30) Foreign Application Priority Data

Feb. 5, 2002 (KR) ............... 10-2002-0006596
Feb. 9, 2002 (KR) ............... 10-2002-0007756

(51) Int. Cl.
*H04B 1/00* (2006.01)
*H04B 7/216* (2006.01)
*H04J 13/00* (2006.01)

(52) U.S. Cl. ............... 375/135; 375/130; 375/146; 375/134; 370/479; 370/441

(58) Field of Classification Search ........ 375/130–153; 370/310, 479, 441, 480–482, 341–343, 208; 455/464, 500, 509, 515, 59, 61, 73, 68, 69, 455/701–703
See application file for complete search history.

(56) References Cited

U.S. PATENT DOCUMENTS

| 6,952,454 | B1 * | 10/2005 | Jalali et al. ............... 375/260 |
| 2003/0067961 | A1 * | 4/2003 | Hudson et al. ............. 375/130 |
| 2003/0114162 | A1 * | 6/2003 | Chheda et al. ............. 455/447 |

* cited by examiner

*Primary Examiner*—David C. Payne
*Assistant Examiner*—Linda Wong
(74) *Attorney, Agent, or Firm*—The Farrell Law Firm, PC

(57) ABSTRACT

A method and apparatus for efficiently transmitting and receiving information about spreading codes used for a packet data-transmitting channel in a spread spectrum communication system. A BS determines Walsh codes for spreading a PDCH and transmits on a PDCCH an index of a last determined Walsh code. Also, if the determined Walsh codes cannot be fully represented by the use of the last Walsh code index only, the BS transmits a Walsh space bitmap indicating the availability of the Walsh codes individually on another PDCCH or a WAICH.

46 Claims, 14 Drawing Sheets

| Index | # of 32ary Walsh Code |
|---|---|
| 0 | 31 |
| 1 | 15 |
| 2 | 23 |
| 3 | 7 |
| 4 | 27 |
| 5 | 11 |
| 6 | 19 |
| 7 | 3 |
| 8 | 29 |
| 9 | 13 |
| 10 | 21 |
| 11 | 5 |
| 12 | 25 |
| 13 | 9 |
| 14 | 30 |
| 15 | 14 |
| 16 | 22 |
| 17 | 6 |
| 18 | 26 |
| 19 | 10 |
| 20 | 18 |
| 21 | 2 |
| 22 | 28 |
| 23 | 12 |
| 24 | 20 |
| 25 | 4 |
| 26 | 24 |
| 27 | 8 |

FIG.3

| 32ary Walsh Code | 16ary Walsh Code | 8ary Walsh Code | 4ary Walsh Code |
|---|---|---|---|
| 31 | 15 | 7 | 3 |
| 15 | | | |
| 23 | 7 | | |
| 7 | | | |
| 27 | 11 | 3 | |
| 11 | | | |
| 19 | 3 | | |
| 3 | | | |
| 29 | 13 | 5 | |
| 13 | | | |
| 21 | 5 | | |
| 5 | | | |
| 25 | 9 | | |
| 9 | | | |
| 30 | 14 | 6 | 2 |
| 14 | | | |
| 22 | 6 | | |
| 6 | | | |
| 26 | 10 | 2 | |
| 10 | | | |
| 18 | 2 | | |
| 2 | | | |
| 28 | 12 | 4 | |
| 12 | | | |
| 20 | 4 | | |
| 4 | | | |
| 24 | 8 | | |
| 8 | | | |

| | |
|---|---|
| | Used by Voice and/or F-SCH Data |
| | Used by F-SCH Data |
| | Available for F-PDCH |
| | Used by Common Channels |

FIG.4

| Walsh Bit Map | 16ary Walsh Code | 32ary Walsh Code |
|---|---|---|
| BIT 9 | $W_{15}$ | 31,15 |
| BIT 10 | $W_7$ | 23,7 |
| BIT 11 | $W_{11}$ | 27,11 |
| BIT 12 | $W_3$ | 19,3 |
| BIT 13 | $W_{13}$ | 29,13 |
| BIT 14 | $W_5$ | 21,5 |
| BIT 15 | $W_9$ | 25,9 |
| BIT 16 | $W_{14}$ | 30,14 |
| BIT 17 | $W_6$ | 22,6 |
| BIT 18 | $W_{10}$ | 26,10 |
| BIT 19 | $W_2$ | 18,2 |
| BIT 20 | $W_{12}$ | 28,12 |
| BIT 21 | $W_4$ | 20,4 |

FIG.6

| WAICH Information | 16ARY WALSH CODE | 32ARY Walsh Code |
|---|---|---|
| BIT 0 | $W_{15}$ | 31,15 |
| BIT 1 | $W_7$ | 23,7 |
| BIT 2 | $W_{11}$ | 27,11 |
| BIT 3 | $W_3$ | 19,3 |
| BIT 4 | $W_{13}$ | 29,13 |
| BIT 5 | $W_5$ | 21,5 |
| BIT 6 | $W_9$ | 25,9 |
| BIT 7 | $W_{14}$ | 30,14 |
| BIT 8 | $W_8$ | 22,6 |
| BIT 9 | $W_{10}$ | 26,10 |
| BIT 10 | $W_2$ | 18,2 |
| BIT 11 | $W_{12}$ | 28,12 |
| BIT 12 | $W_4$ | 20,4 |

FIG.11

METHOD AND APPARATUS FOR TRANSMITTING AND RECEIVING INFORMATION ABOUT SPREADING CODES USED FOR A PACKET DATA CHANNEL IN A COMMUNICATION SYSTEM

PRIORITY

This application claims priority under 35 U.S.C. §119 to an application entitled "Method and Apparatus for Transmitting and Receiving Information about Spreading Code Used for Packet Data Channel in a Communication System" filed in the Korean Industrial Property Office on Feb. 5, 2002 and assigned Serial No. 2002-6596, and to an application entitled "Method and Apparatus for Transmitting and Receiving Information about Spreading Code Used for Packet Data Channel in a Communication System" filed in the Korean Industrial Property Office on Feb. 9, 2002 and assigned Serial No. 2002-7756, the contents of both of which are hereby incorporated by reference.

BACKGROUND OF THE INVENTION

1. Field of the Invention

The present invention relates generally to a communication system supporting packet data service, and in particular, to a method and apparatus for transmitting information indicating a spreading code used for a packet data channel (PDCH).

2. Description of the Related Art

A conventional mobile communication system provides only a voice service. Growing user demand and advanced communication technology have developed mobile communication systems that can additionally provide a data service. A mobile communication system supporting multimedia service including voice and data services provides voice service to a plurality of users in the same frequency band and provides data service in time division multiplexing (TDM). Particularly, a CDMA (Code Division Multiple Access) mobile communication system transmits user data to a particular user for a predetermined time by TDM.

The mobile communication system supporting packet data service uses the PDCH that delivers actual packet data and the PDCCH (Packet Data Control Channel) that deliver control information for efficient packet data transmission. Packet data transmission is carried out on a PLP (Physical Layer Packet) basis and a receiver efficiently receives the packet data using the control information.

The control information informs users that intend to receive a data service on the PDCH of a user to which packet data is destined for at a particular time point, its length, and its transmission parameters, such as a modulation scheme and a coding rate used. Fields of the control information on the PDCCH are illustrated in Table 1. It should be noted here that the control information can be formed by selecting part of the fields or by adding additional fields to the fields, and the length of each field varies depending on system implementation.

TABLE 1

| Field | Length in bits |
| --- | --- |
| MAC_ID | 8 |
| ARQ Channel ID | 2 |
| Subpacket ID | 2 |
| Encoder Packet Size | 3 |

TABLE 1-continued

| Field | Length in bits |
| --- | --- |
| Last Walsh Code Index | 5 |
| Sequence Bit | 1 |
| Total | 21 |

Referring to Table 1, the control information is formed using an 8-bit MAC (Media Access Control) ID (Identifier) for identifying a user, a 3-bit payload size (i.e., a 3-bit encoder packet size), a 2-bit SPID (Subpacket ID) for indicating the number of retransmission occurrences of the same packet data, a 2-bit ARQ (Automatic Repeat Request) channel ID for indicating a channel that delivers packet data, a 5-bit last Walsh code index for indicating Walsh codes used for spreading the PDCH, and 1-bit sequence information.

In a mobile communication system supporting high-rate packet transmission, a subpacket is a transport unit for transmitting data on the PDCH. Subpacket length is the temporal length of TDM data transmitted on the PDCH. If the data length is variable, a changed data length must be represented to a receiver. Since a transmitter repeats the control information according to the subpacket length prior to transmission, the receiver determines the subpacket length from the control information. The data rate and modulation scheme of the PDCH are determined according to a combination of the subpacket length, the payload size, and Walsh codes used for the PDCH. The data rate is the transmission rate of the packet data on the PDCH and the modulation scheme is one of QPSK (Quadrature Phase Shift Keying), 8PSK (8-ary PSK), 16QAM (16-ary Quadrature Amplitude Modulation), and 64QAM.

The payload size is the number of information bits included in one subpacket, the SPID identifies a set of subpackets retransmitted by ARQ, and the ARQ channel ID identifies a parallel transmission channel to support continuous data transmission for the user.

To receive a high-rate packet data service, a mobile station (MS) is assigned to its unique MAC ID at system access and determines whether its packet is received on a PDCH by checking a MAC ID obtained from a PDCCH through demodulation. If a packet is destined for the MS, the MS demodulates the PDCH using the other information fields of the PDCCH, that is, the Payload Size, the SPID, the ARQ Channel ID, and the Last Walsh code Index.

FIG. 1 is a block diagram of a conventional PDCCH transmitter 100. Referring to FIG. 1, an error detection bits adder 110 adds, for example, an 8-bit CRC (Cyclic Redundancy Code) to a 21-bit F-PDCCH (Forward PDCCH) input sequence containing control information to detect transmission errors in the input sequence.

A tail bits adder 120 adds tail bits to the 29-bit CRC-added sequence, for convergence to a predetermined state. The tail bits are 8 zeroes for convolutional encoding. A convolutional encoder 130 encodes the 37-bit information received from the tail bits adder 120 at a predetermined coding rate R. The coding rate R is determined according to the number N of slots that transmit the control information. If the control information requires 1 slot, the convolutional encoder 130 outputs two symbols for the input of every one bit (R=½). If the control information requires 2 or 4 slots, the convolutional encoder 130 outputs three symbols for the input of every one bit (R=⅓).

A symbol repeater 140, if N=4, repeats the convolutional code symbols one time. As a result, the symbol repeater 140 outputs 74, 111, and 222 symbols when N=1, 2 and 4, respectively.

A symbol puncturer 150 punctures 26, 15, and 30 symbols in the repeater output when N=1, 2, and 4, respectively, according to a puncturing pattern that minimizes performance degradation and matches to an appropriate data rate. An interleaver 160 interleaves the punctured symbols according to a predetermined interleaving rule to reduce the influence of burst errors that degrade coding performance. The interleaver 160 can be a kind of block interleaver, such as a BRI (Bit Reverse Interleaver). The BRI arranges even-numbered symbols in a first half of an interleaver output and odd-numbered symbols in a last half, after interleaving such that the distance between symbols is widest.

A modulator 170 modulates the interleaved symbols in a predetermined modulation scheme like QPSK. Spreaders 180 spread I (In phase)-channel modulated symbols and Q (Quadrature phase)-channel modulated symbols with a spreading code $W_i^{64}$ assigned to the PDCCH. The spread signals are transmitted to an MS.

FIG. 2 is a block diagram of a conventional PDCCH receiver 200 corresponding to the PDCCH transmitter 100 illustrated in FIG. 1. As described above, control information is received in 1, 2, or 4 slots and the number N of the slots is equal to the length of packet data. Therefore, the PDCCH receiver 200 determines the length of the control information, that is, the length of the packet data using a received PDCCH signal.

Referring to FIG. 2, the PDCCH receiver 200 comprises four reception blocks 210 to 240. The four reception blocks 210 to 240 each receive 48 symbols and check the CRC of the received symbols, thereby detecting the packet length. The symbols are demodulated soft decision values.

The first reception block 210 is used to receive 1-slot control information about 1-slot packet data, the second reception block 220 is used to receive 2-slot control information about 2-slot packet data, the third reception block 230 is used to receive 4-slot control information about 4-slot packet data, and the fourth reception block 240 is used to receive 4-slot control information about 8-slot packet data.

In operation, deinterleavers 212, 222, 232, and 242 in the first to fourth reception blocks 210 to 240 deinterleave 48, 96, 192 and 192 symbols received respectively in 1, 2, and 4 slots. Depuncturers 214, 224, 234, and 244 respectively depuncture 10, 20, 40, and 40 symbols in the deinterleaved symbols. Combiners 235 and 245 in the reception blocks 230 and 240 combine every 2 consecutive symbols in the depunctured symbols received from the depuncturers 234 and 244, in an order reverse to the operation of the repeater 140 illustrated in FIG. 1.

Convolutional decoders 216, 226, 236, and 246 decode the depunctured symbols received from the depuncturers 214 and 224 and the combined symbols received from the combiners 235 and 245 at corresponding coding rates. The convolutional decoder 216 for 1-slot control information decodes at a coding rate of ½, and the convolutional decoders 226, 236, and 246, for 2- or 4-slot control information, decode at a coding rate of ⅓.

CRC checkers 218, 228, 238, and 248 check the CRCs of the decoded data using predetermined initial values of 1 (the CRC checkers 218, 228, and 238) and 0 (the CRC checker 248).

A controller 250 determines the length of control information, that is, the length of packet data according to the CRC check results. Specifically, the controller 250 determines the packet data length as the slot length corresponding to a reception block having a good CRC check value.

The four reception blocks 210 to 240 can be constituted as physically independent blocks, or incorporated into a single reception block having different reception parameters including an interleaving rule, a puncturing pattern, a coding rate, and an initial value.

The PDCH is usually spread with all available Walsh codes of length 32. The available Walsh codes are the remaining Walsh codes in a whole code space, not including Walsh codes assigned to circuit channels for voice service and Walsh codes available to common channels. Hence the PDCH spreading codes are variable.

The PDCCH delivers information about the spreading codes of the PDCH, as stated before. A base station (BS) transmits to an MS on the PDCCH the index of the last of the assigned Walsh codes in a Walsh code list preset between the BS and the MS. The MS receives the PDCH by receiving the PDCCH.

FIG. 3 illustrates an example of a Walsh code list. Referring to FIG. 3, a total of 28 Walsh codes of length 32 are available to the PDCH. The BS informs the MS of the 5-bit index of the last of Walsh codes assigned to the PDCH.

If six Walsh codes assigned to the PDCH are #31(index 0), 15(1), 23(2), 7(3), 27(4), and 11(5) are used for the PDCH, the BS transmits the MS the index "00101" (5) of the last Walsh code #11 on the PDCCH. The MS then extracts Walsh code #11 from the Walsh code list, considering that Walsh codes #31, 15, 23, 7, 27 and 11 have been used for the PDCH.

If Walsh codes having a shorter length, 4 or 8 are used for circuit channels to provide a high-rate circuit data service, it may occur in the above Walsh code information transmitting method that Walsh codes indicated by the index of the last Walsh code cannot be used for the PDCH. This problem is apparent in FIG. 4.

FIG. 4 illustrates Walsh codes assigned to voice and circuit data channels and Walsh codes available to the PDCH. Referring to FIG. 4, the first column is a length 32 Walsh code list, and the second, third and fourth columns are length 16, 8, and 4 Walsh code lists, respectively. A Walsh code of length 4 assigned to a circuit data channel, that is, an F-SCH (Forward Supplemental Channel) is marked with slanting lines from the upper left to the lower right, Walsh codes assigned to the voice service and F-SCHs are marked with horizontal lines, and Walsh codes available to the PDCH are marked with slanting lines from the lower left to the upper right.

Referring to FIG. 4, since a length 4 Walsh code #3 is in use for the F-SCH, the first Walsh code available to the PDCH is in the middle of the length 32 Walsh code list. In this case, although 11 Walsh codes #29 to #26 are available to the PDCH, the transmitter cannot represent the available Walsh codes using the 5-bit last Walsh code index. Consequently, the receiver cannot determine the Walsh codes assigned to the PDCH.

SUMMARY OF THE INVENTION

It is, therefore, an object of the present invention to provide a method and apparatus for efficiently transmitting information about Walsh codes used for a PDCH in order to allow as many available Walsh codes as possible to be assigned to the PDCH.

It is another object of the present invention to provide a method and apparatus for efficiently receiving information about Walsh codes used for a PDCH.

To achieve the above and other objects, according to one aspect of the present invention, in a method of transmitting information about spreading codes used for a PDCH in a spread spectrum communication system supporting a packet data service, spreading codes available for the PDCH are determined in a spreading code list including spreading codes arranged in a predetermined order. First control information including the index of the last of the determined spreading codes is transmitted on a first control channel. However, if the determined spreading codes cannot be represented by the last spreading code index only, second control information including a spreading code bitmap indicating the availability of the spreading codes individually is transmitted on a second control channel.

In a method of receiving information about spreading codes used for a PDCH in a spread spectrum communication system supporting a packet data service, first control information is received on a first control channel and a user ID is checked in the first control information. If the user ID is identical to the ID of a user that receives the first control information, an index of a last spreading code available for the PDCH in a spreading code list including spreading codes arranged in a predetermined order is acquired from the first control information. Second control information is then received on a second control channel and a user ID is checked in the second control information. If the user ID is identical to a selected value, a spreading code bitmap indicating available spreading codes for the PDCH individually is acquired from the second control information. The available spreading codes are determined using the last spreading code index and the spreading code bitmap.

According to another aspect of the present invention, in a method of transmitting information about spreading codes used for a PDCH in a spread spectrum communication system supporting a packet data service, spreading codes available for the PDCH are determined in a spreading code list including spreading codes arranged in a predetermined order. It is determined whether the determined spreading codes can be represented by an index of a last of the determined spreading codes only. First control information including the index of the last spreading code index and a flag indicating whether the determined spreading codes can be represented by the last spreading code index, is transmitted on a first control channel. If the determined spreading codes cannot be represented by the last spreading code index only, second control information including a spreading code bitmap indicating the availability of the spreading codes individually is transmitted on a second control channel.

In a method of receiving information about spreading codes used for a PDCH in a spread spectrum communication system supporting a packet data service, first control information is received on a first control channel and a user ID is checked in the first control information. If the user ID is identical to the ID of a user that receives the first control information, an index of a last spreading code available for the PDCH in a spreading code list including spreading codes arranged in a predetermined order, is acquired from the first control information. A flag included in the first control information is checked to determine whether spreading codes available for the PDCH can be represented by the last spreading code index only. If the available spreading codes cannot be represented by the last spreading code index only, second control information is received on a second control channel and a spreading code bitmap indicating the available spreading codes individually is acquired from the second control information. Then the available spreading codes are determined using the last spreading code index and the spreading code bitmap.

BRIEF DESCRIPTION OF THE DRAWINGS

The above and other objects, features, and advantages of the present invention will become more apparent from the following detailed description when taken in conjunction with the accompanying drawings in which:

FIG. 3 illustrates an example of a Walsh code list preset between a BS and an MS;

FIG. 4 illustrates Walsh codes used for a circuit channel and a PDCH in Walsh code lists;

FIG. 6 illustrates an example of a 13-bit Walsh space bitmap transmitted on a second PDCCH;

FIG. 11 illustrates an example of a 13-bit Walsh space bitmap transmitted on a Walsh availability indicator channel (WAICH) according to the second embodiment of the present invention;

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The following description is made of a PDCCH transmitter and receiver for transmitting and receiving control information about a PDCH and their operations in a mobile communication system supporting packet data transmission according to the present invention. While it will be described that the present invention is implemented in a 1xEV-DV (Evolution-Data and Voice) system, which is a synchronous CDMA2000 (Code Division Multiple Access) 2000 system proposed by the 3GPP2 ($3^{rd}$ Generation Partnership Project 2), the present invention is also applicable to other systems having similar technological background and channel structure.

Two preferred embodiments are presented below to carry out transmission of Walsh code information according to the present invention.

First Embodiment

In accordance with a first embodiment of the present invention, when all Walsh codes available to a PDCH cannot be represented simply by transmitting the index of the last of the available Walsh codes on a PDCCH (hereinafter, referred to as a first PDCCH or PDCCH1), a Walsh space bitmap is transmitted on another PDCCH having the same configuration (hereinafter, referred to as a second PDCCH or PDCCH2) to indicate the availability of the other individual Walsh codes, not including Walsh codes used for common channels. The Walsh space bitmap may be referred to as a Walsh mask bitmap.

Control information of the first PDCCH and control information of the second PDCCH are defined as first control information and second control information, respectively. The first control information contains the last index of Walsh codes used for the PDCH in a preset Walsh code list and the second control information contains a Walsh space bitmap that indicates whether individual Walsh codes represented by the last Walsh code index are used or not. Thus, a receiver determines from the first control information received on the first PDCCH the last Walsh code index indicating the Walsh codes used for the PDCH in the Walsh code list. The receiver then determines the presence or absence of the second PDCCH. Upon receipt of the second PDCCH, the receiver determines from the Walsh space bitmap in the second control information whether the individual Walsh codes represented by the last Walsh code index are used for the PDCH. When the Walsh codes assigned to the PDCH do not start with the first Walsh code in the Walsh code list, or are not arranged successively, it is said that "a Walsh hole exists".

Figure 5:
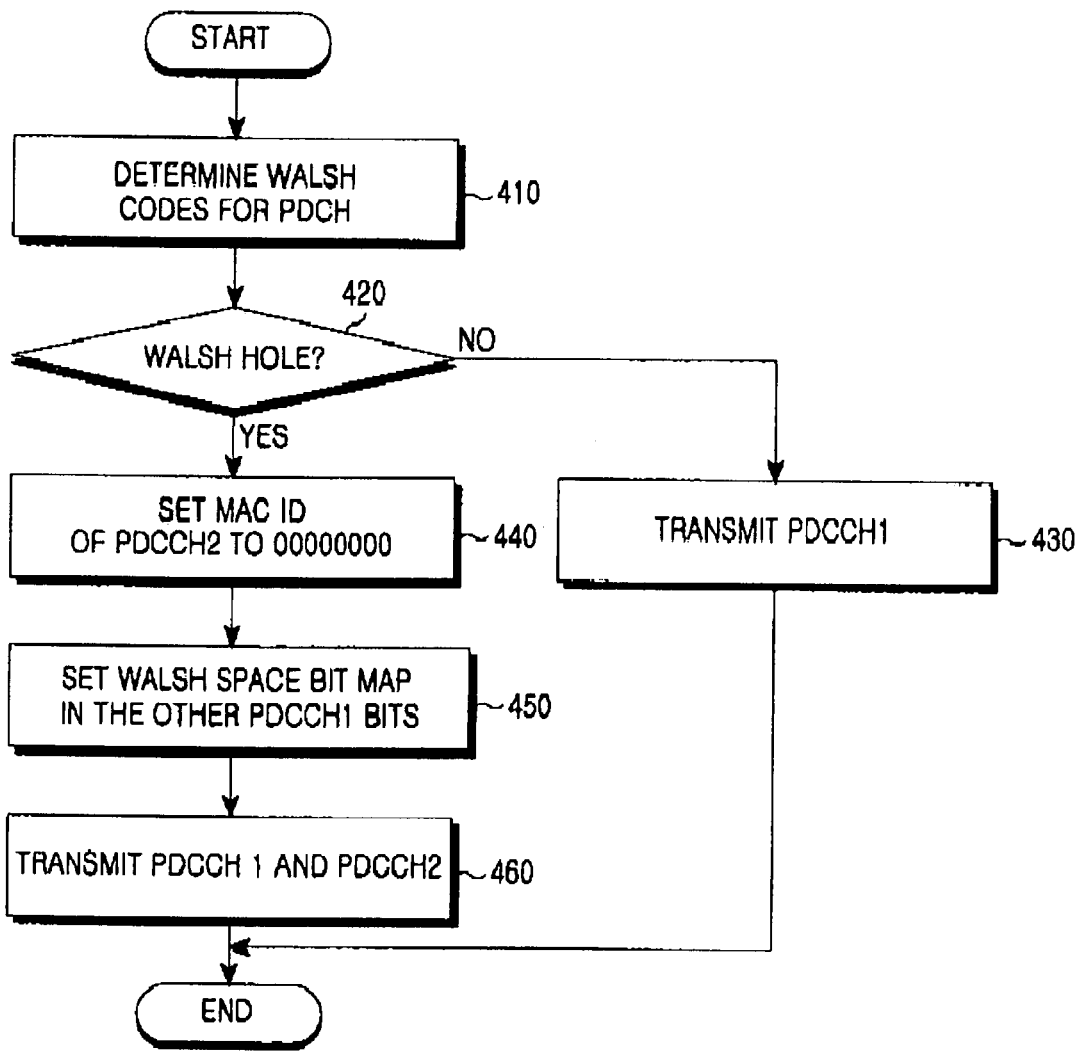
FIG. 5 is a flowchart illustrating an operation for transmitting Walsh code information in a BS according to an embodiment of the present invention.

FIG. 5 is a flowchart illustrating an operation in a BS for transmitting information about Walsh codes assigned to the PDCH on the first and second PDCCHs according to the first embodiment of the present invention. Referring to FIG. 5, the BS determines Walsh codes available for spreading the PDCH in step 410. The other Walsh codes, not including those assigned to voice and other circuit data channels in a whole Walsh space, are available to the PDCH. In step 420, the BS determines whether all the available Walsh codes can be represented by the index of the last Walsh code. In other words, the BS determines whether a Walsh hole exists in a Walsh code list preset between the BS and an MS. As described above, if a Walsh hole exists, it implies that the available Walsh codes start in the middle of the Walsh code list, or are not arranged successively.

If there is no Walsh hole, that is, the available Walsh codes are successive and start with the first index in the Walsh code list, the BS transmits to the MS first control information containing the last index of the Walsh codes in step 430. Alternatively, in the presence of the Walsh hole, the available Walsh codes cannot be represented by the 5-bit last index only. Therefore, a Walsh space bitmap is additionally transmitted to indicate the available Walsh codes among Walsh codes represented by the last index. To transmit the Walsh space bitmap, in step 440, the BS sets a MAC ID (bits #1 to #8) in second control information to the MAC ID of the first control information, or a selected value which other MSs do not use, for example, "0000 0000", in order to notify that the subsequent bits to the bits of the MAC ID provide Walsh hole information. In step 450, the remaining 13 bits (bits #9 to 21) of the second control information are set to corresponding values indicating whether 13 individual Walsh codes of length 16 corresponding to the 13 bits are available. Each of the 13 Walsh codes of length 16 corresponds to 26 Walsh codes of length 32.

Referring to FIG. 4, Walsh codes of length 16 are arranged in the order of #15, 7, 11, 3, 13, 5, 9, 14, 6, 10, 2, 12, 4, and 8 and the last Walsh code #8 is always unavailable. Therefore, the bits #9 to #21 of the second control information are set to 0 or 1 to indicate whether the individual Walsh codes #15, 7, 11, 3, 13, 5, 9, 14, 6, 10, 2, 12 and 4 are available.

Finally, the BS transmits the first control information containing the last index of the available Walsh codes on the first PDCCH and the second control information containing the MAC ID and the Walsh space bitmap on the second PDCCH in step 460.

Table 2 illustrates the format of the second control information according to the first embodiment of the present invention.

TABLE 2

| Field | Length in bits |
|---|---|
| MAC_ID | 8 |
| 16-ary Walsh Bitmap | 13 |
| Total | 21 |

Referring to Table 2, the second control information occupies a total of 21 bits, equal to the bit number of the first control information. As stated before, the 8-bit MAC ID of the second PDCCH does not denote a particular MS and is set to, for example, "0000 0000" to indicate that the second PDCCH transmits Walsh hole information. The BS does not assign "0000 0000" as a 8-bit MAC ID for identifying an MS. Alternatively, the MAC ID of the second PDCCH can be set to that of the first PDCCH to identify the MS, instead of indicating transmission of Walsh hole information.

Herein below, the former case is adopted. That is, when a Walsh hole exists, the 8-bit MAC ID of the second PDCCH is set to "0000 0000" to indicate that the other 13 bits provide information about availability of the individual Walsh codes of length 16.

FIG. 6 illustrates an example of a 13-bit Walsh space bitmap transmitted on the second PDCCH. Referring to FIG. 6, the first column indicates a Walsh space bitmap contained in the second control information of the second PDCCH. The Walsh space bitmap occupies bits #9 to #21. The second and third columns indicate Walsh codes of length 16 and Walsh codes of length 32. The length 16 Walsh codes are in a one-to-two correspondence with the length 32 Walsh codes. The length 32 Walsh codes are arranged in the same order as in the Walsh code list illustrated in FIG. 3.

The second control information of the second PDCCH indicates the availability of each Walsh code of length 16 corresponding to each two Walsh codes of length 32 through the Walsh space bitmap illustrated in FIG. 6. Therefore, if a Walsh code of length 16 is 1, the receiver considers that two Walsh codes of length 32 corresponding to the Walsh code of length 16 are available to the PDCH.

Figure 7:
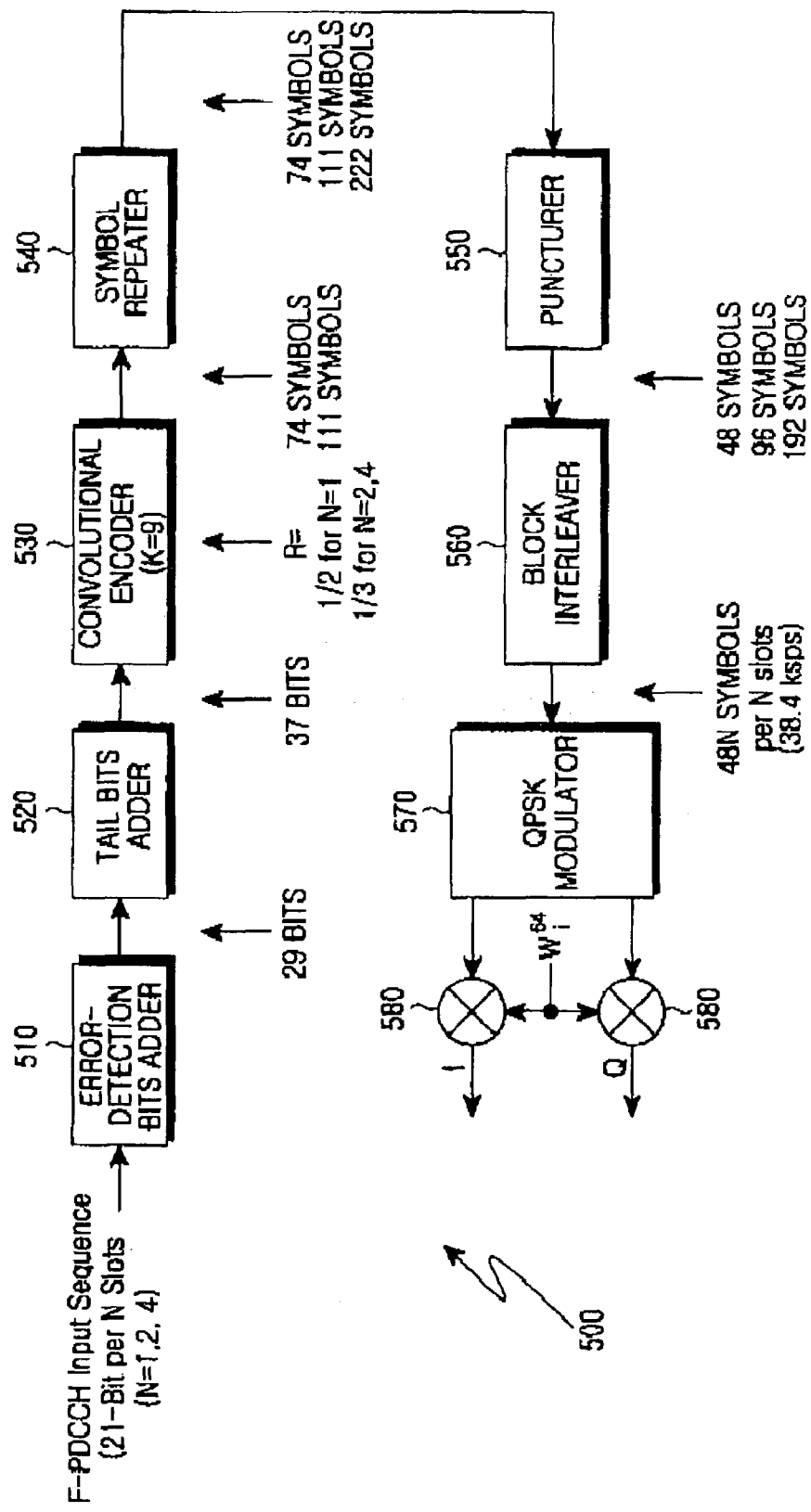
FIG. 7 is a block diagram of a second PDCCH transmitter according to the embodiment of the present invention.

FIG. 7 is a block diagram of a second PDCCH transmitter 500 according to the first embodiment of the present invention. Referring to FIG. 7, an error detection bits adder 510 adds error detection bits, for example, an 8-bit CRC to a 21-bit F-PDCCH input sequence containing a MAC ID and a Walsh space bitmap as second control information to detect transmission errors in the input sequence.

A tail bits adder 520 adds tail bits to the 29-bit CRC-added sequence for convergence to a predetermined state. The tail bits are 8 zeroes for convolutional encoding. A convolutional encoder 530 encodes the 37-bit information received from the tail bits adder 520 at a predetermined coding rate R. The coding rate R is determined according to the number N of slots that transmit the second control information. If N=1, the convolutional encoder 530 outputs two symbols for the input of every one bit (R=½). If N=2 or 4, the convolutional encoder 530 outputs three symbols for the input of every one bit (R=⅓).

A symbol repeater 540, if N=4, repeats the convolutional code symbols one time (repetition factor=2). As a result, the symbol repeater 540 outputs 74, 111, and 222 symbols when N=1, 2, and 4, respectively.

A symbol puncturer 550 punctures 26, 15, and 30 symbols in the repeater output when N=1, 2, and 4, respectively, according to a puncturing pattern that minimizes performance degradation and matches to an appropriate data rate. An interleaver 560 interleaves the punctured symbols according to a predetermined interleaving rule to reduce the influence of burst errors that degrade coding performance. The interleaver 560 can be a BRI, i.e., a kind of a block interleaver. The BRI arranges even-numbered symbols in the first half of the whole interleaver output and odd-numbered symbols in the last half after interleaving such that the distance between symbols is widest.

A modulator 570 modulates the interleaved symbols in a predetermined modulation scheme like QPSK. Spreaders 580 spread I-channel modulated symbols and Q-channel modulated symbols with a spreading code $W_i^{64}$ assigned to the second PDCCH. The spread signals are transmitted to an MS.

Figure 1:
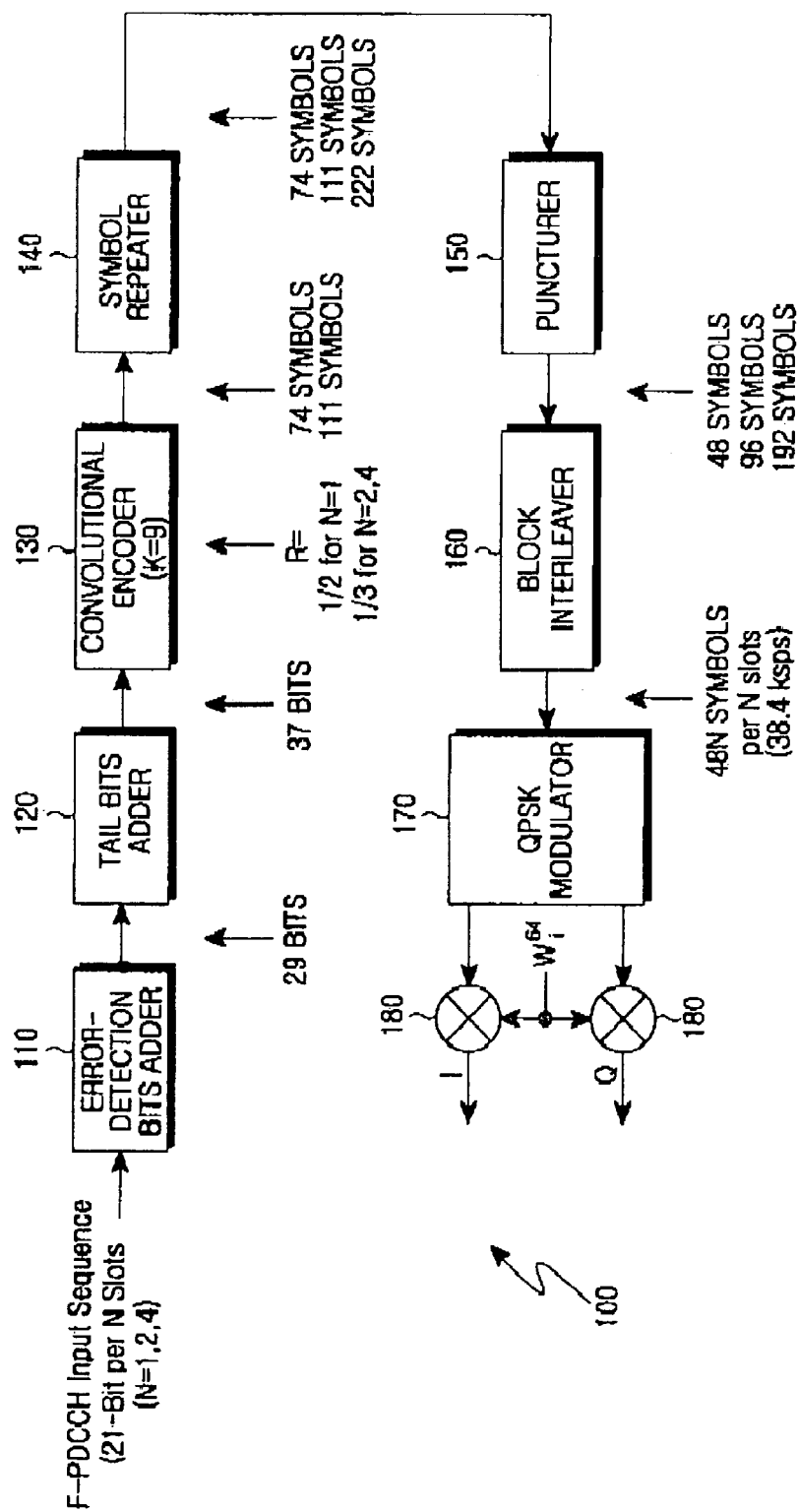
FIG. 1 is a block diagram of a conventional PDCCH transmitter.

The second PDCCH transmitter illustrated in FIG. 7 is of the same configuration as the first PDCCH transmitter illustrated in FIG. 1. That is, the BS transmits the first and second PDCCHs of the same configuration with the same power.

Figure 8:
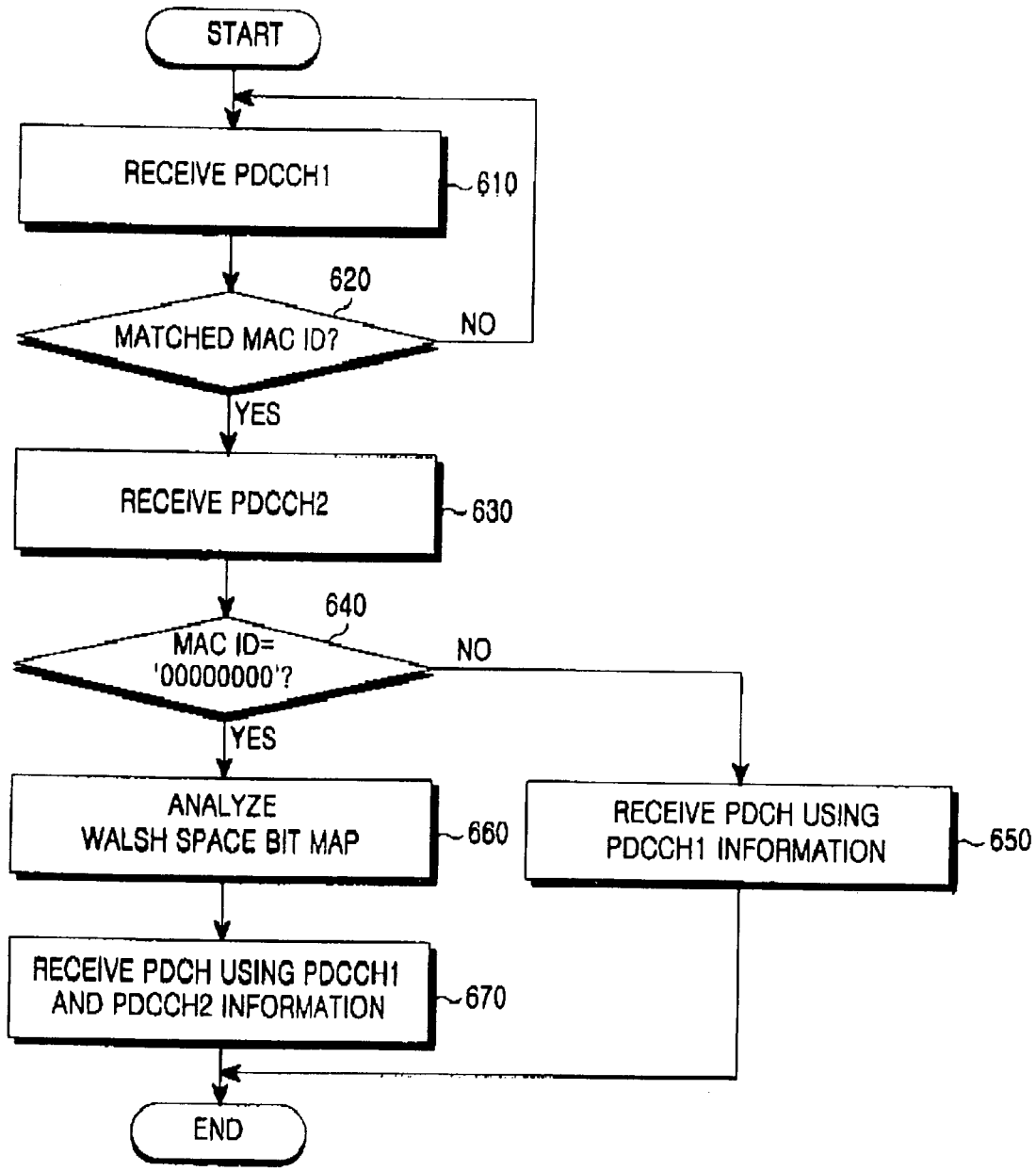
FIG. 8 is a flowchart illustrating an operation for receiving Walsh code information in an MS according to the embodiment of the present invention.

FIG. 8 is a flowchart illustrating an operation in an MS for receiving Wash code information of the PDCH on the first and second PDCCHs according to the first embodiment of the present invention. Referring to FIG. 8, the MS receives first control information on the first PDCCH in step 610. The first control information contains the last Walsh code index available to the PDCH in a Walsh code list preset between a BS and the MS. In step 620, the MS checks a MAC ID in the first control information to determine whether the PDCH has a packet destined for the MS. If the MAC ID does not match the MS's MAC ID, the MS returns to step 610. If the MAC ID are identical, the MS receives second control information on the second PDCCH in step 630 and determines whether a MAC ID in the second control information is a selected value indicating a Walsh hole, for example, "0000 0000" in step 640. If the MAC ID is not "0000 0000", the MS receives the PDCH using Walsh codes indicated by the first control information in step 650, determining that there is no Walsh hole in the Walsh codes.

Alternatively, if the MAC ID is "0000 0000", the MS determines whether individual Walsh codes of length 16 corresponding to the Walsh codes indicated by the first control information are available, considering that the other 13 bits of the second control information represents a Walsh space bitmap, in step 660. In step 670, the MS receives the PDCH using the last Walsh code index included in the first control information and Walsh codes detected by the Walsh space bitmap included in the second control information. For example, if the last Walsh code index obtained from the first control information indicates a length 32 Walsh code #26 in FIG. 4, the MS determines that Walsh codes #31, 15, 23, 7, 27, 11, 19, 3, 29, 13, 21, 5, 25, 9, 30, 14, 22, 6, and 26 are available to the PDCH. And if the Walsh space bitmap obtained from the second control information is 0000 1111 1111 1 (0 and 1 indicate unavailability and availability, respectively), the eight Walsh codes #31, 15, 23, 7, 27, 11, 19 and 3 are unavailable and the other Walsh codes #29, 13, 21, 5, 25, 9, 30, 14, 22, 6, and 26 are available.

Figure 9:
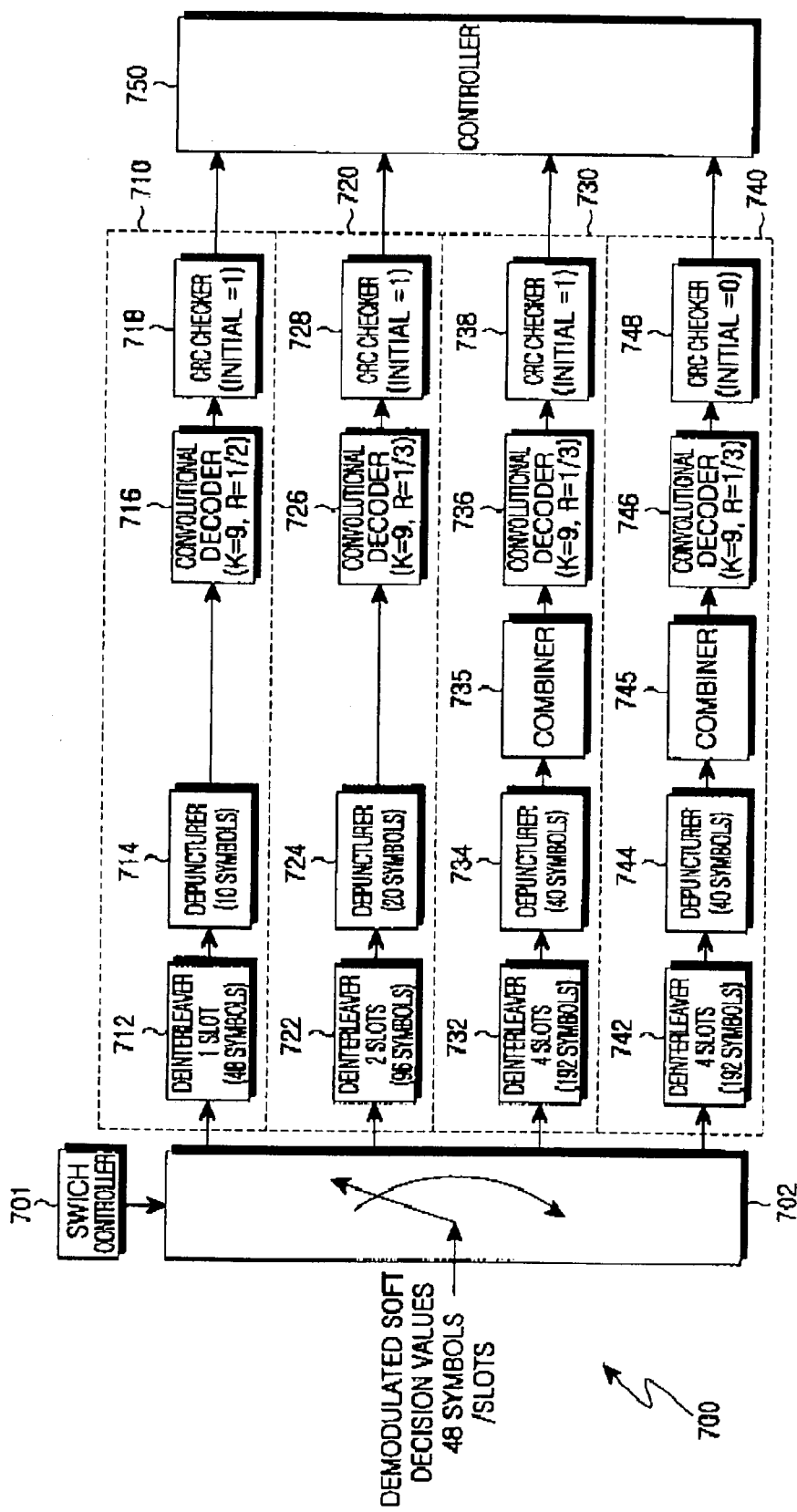
FIG. 9 is a block diagram of a second PDCCH receiver according to the embodiment of the present invention.

FIG. 9 is a block diagram of a second PDCCH receiver 700 corresponding to the second PDCCH transmitter 500 illustrated in FIG. 7 according to the first embodiment of the present invention. Referring to FIG. 9, the second PDCCH receiver 700 comprises four reception blocks 710 to 740. A switch controller 701 controls a switch 702 according to a packet length determined from the first control information received on the first PDCCH. The switch 702 switches demodulated soft decision values, 48 symbols per slot, to one of the reception blocks 710 to 740 according to the length information (N=1, 2, 4, 8). The reception block processes the symbols and outputs second control information.

The first reception block 710 is used to receive 1-slot control information about 1-slot packet data, the second reception block 720 is used to receive 2-slot control information about 2-slot packet data, the third reception block 730 is used to receive 4-slot control information about 4-slot packet data, and the fourth reception block 740 is used to receive 4-slot control information about 8-slot packet data.

In operation, deinterleavers 712, 722, 732 and 742, in the first to fourth reception blocks 710 to 740, deinterleave 48, 96, 192 and 192 symbols, respectively. Depuncturers 714, 724, 734 and 744 respectively depuncture 10, 20, 40, and 40 symbols in the deinterleaved symbols. Combiners 735 and 745 in the reception blocks 730 and 740 combine every 2 consecutive symbols in the depunctured symbols received from the depuncturers 734 and 744, in an order reverse to the operation of the repeater 540 illustrated in FIG. 7.

Convolutional decoders 716, 726, 736, and 746 decode the depunctured symbols received from the depuncturers 714 and 724 and the combined symbols received from the combiners 735 and 745 at corresponding coding rates. The convolutional decoder 716 for 1-slot control information decodes at a coding rate of ½, and the convolutional decoders 726, 736, and 746 for 2- or 4-slot information decode at a coding rate of ⅓.

CRC checkers 718, 728, 738 and 748 check the CRCs of the decoded data using predetermined initial values of 1 (the CRC checkers 718, 728, and 738) and 0 (the CRC checker 748).

Upon receipt of second control information having no errors from one of the reception blocks 710 to 740, a controller 750 determines Walsh codes used for the PDCH by analyzing the second control information and already received first control information.

The four reception blocks 710 to 740 can be constituted as physically independent blocks, or incorporated into a single reception block having different reception parameters including an interleaving rule, a puncturing pattern, a coding rate, and an initial value.

Second Embodiment

In accordance with a second embodiment of the present invention, when all Walsh codes available to a PDCH cannot be represented simply by transmitting the last index of the Walsh codes on a PDCCH, a Walsh space bitmap is transmitted on another physical channel, which is selectively transmitted to indicate availability of the other Walsh codes for the PDCH, not including Walsh codes used for common channels. The physical channel is called a WAICH (Walsh code Availability Indicator Channel).

Only when a Walsh space bitmap is to be transmitted, is the WAICH activated. A transmitter additionally transmits a 1-bit flag (hereinafter, referred to as a hole flag) to indicate activation of the WAICH to a receiver. Table 3 below illustrates control information containing the hole flag.

TABLE 3

| Field | Length in bits |
| --- | --- |
| MAC_ID | 8 |
| ARQ Channel ID | 2 |
| Subpacket ID | 2 |
| Encoder Packet Size | 3 |
| Last Walsh Code Index | 5 |
| Sequence Bit | 1 |
| Hole Flag | 1 |
| Total | 22 |

Figure 2:
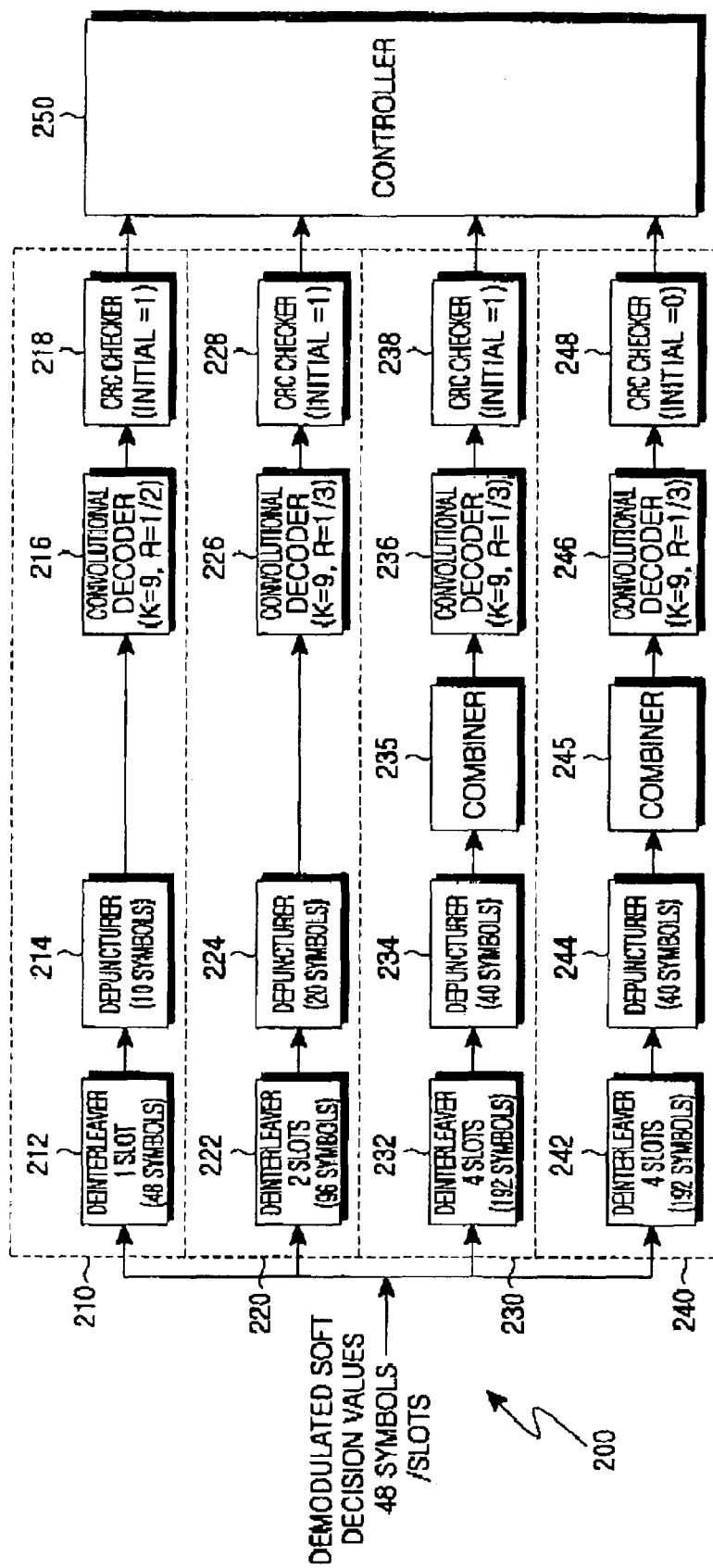
FIG. 2 is a block diagram of a conventional PDCCH receiver.

As compared to Table 1, the 1-bit hole flag is added in Table 3. When the WAICH is activated, the hole flag is set to 1. Otherwise, it is set to 0. Because the PDCCH transmitter and receiver illustrated in FIGS. 1 and 2 can transmit and receive the above 22-bit control information, their description is not provided here. Yet, one thing to be noted herein is that as the 1-bit hole flag is added, the number of punctured or depunctured symbols is increased by 2, 3, and 3 respectively when N=1, 2, and 4.

Figure 10:
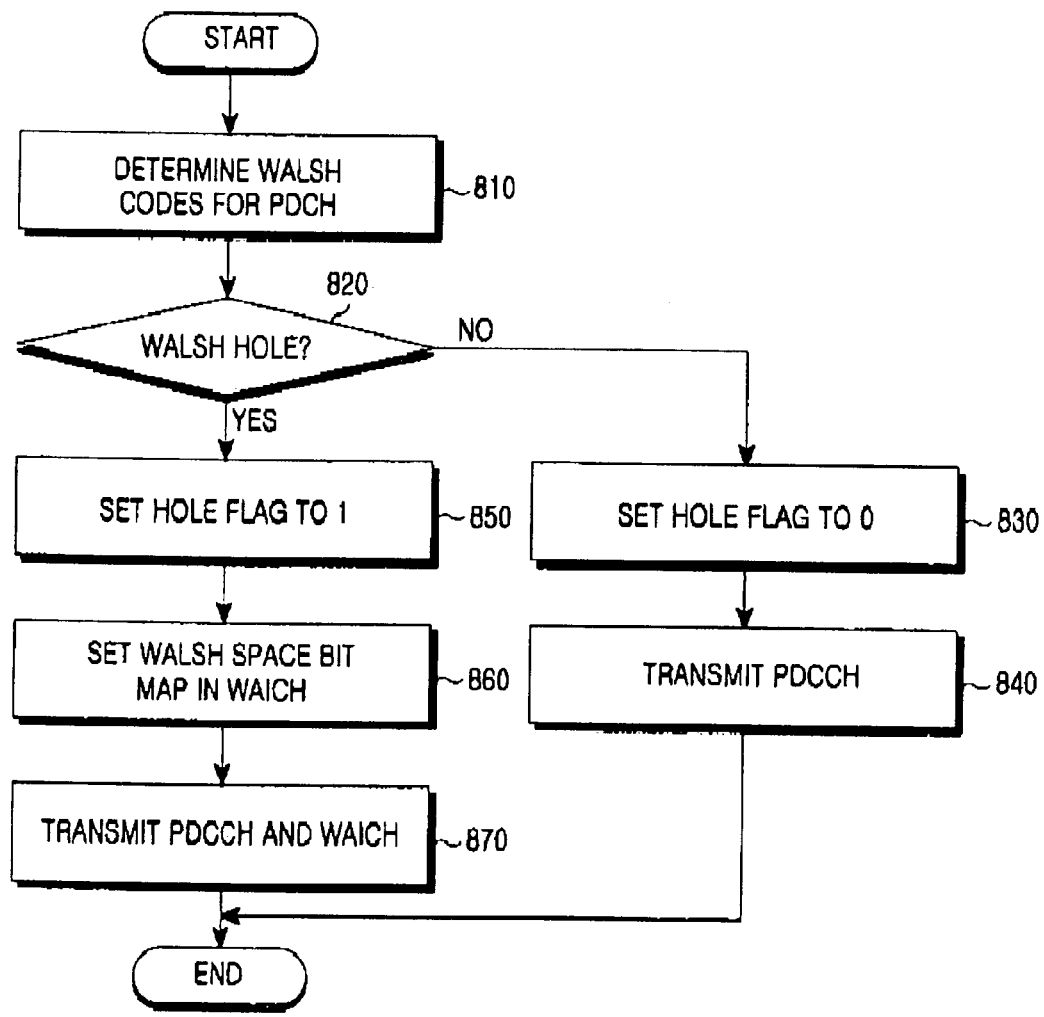
FIG. 10 is a flowchart illustrating an operation for transmitting Walsh code information in the BS according to another embodiment of the present invention.

FIG. 10 is a flowchart illustrating an operation in a BS for transmitting Walsh code information according to the second embodiment of the present invention. Referring to FIG. 10, the BS determines Walsh codes available to the PDCH in step 810. The other Walsh codes, not including those assigned to voice and other circuit data channels, in a whole Walsh space are available to the PDCH. In step 820, the BS determines whether all the available Walsh codes can be represented by the last index of the Walsh codes. In other words, the BS determines whether a Walsh hole exists in a Walsh code list preset between the BS and an MS. As described above, if a Walsh hole exists, it implies that the available Walsh codes start in the middle of the Walsh code list, or are not arranged successively.

If there is no Walsh hole, that is, the available Walsh codes are successive and start with the first index in the Walsh code list, the BS sets the hole flag to 0 because the WATCH is not required in step 830 and transmits to the MS control information containing the hole flag and the 5-bit last Walsh code index in step 840.

Alternatively, when there is a Walsh hole, the available Walsh codes cannot be represented by the 5-bit last index only. Therefore, a Walsh space bitmap is additionally transmitted on the WAICH to individually indicate the availability of successive Walsh codes represented by the last index. To transmit the Walsh space bitmap on the WAICH, the BS sets the hole flag to 1 in step 850, and sets 13 bits of the Walsh space bitmap to corresponding values indicating the availability of 13 Walsh codes of length 16 in step 860.

Referring to FIG. 4, Walsh codes of length 16 are arranged in the order of #15, 7, 11, 3, 13, 5, 9, 14, 6, 10, 2, 12, 4, and 8 and the last Walsh code #8 is always unavailable. Therefore, the 13 bits of the Walsh space bitmap are set to 0 or 1 to indicate the availability of the individual Walsh codes #15, 7, 11, 3, 13, 5, 9, 14, 6, 10, 2, 12, and 4.

The BS transmits first control information containing the last Walsh code index on the first PDCCH and control information containing the Walsh space bitmap on the WATCH in step 870.

As described above, the WAICH transmits a Walsh space bitmap indicating the availability of individual Walsh codes other than Walsh codes used for common channels. If the Walsh space bitmap is 13 bits, it indicates the availability of 13 individual Walsh codes for the PDCH.

FIG. 11 illustrates an example of a 13-bit Walsh space bitmap transmitted on the WAICH. Referring to FIG. 11, the first column indicates the Walsh space bitmap that occupies bits #0 to #12. The second and third columns indicate Walsh codes of length 16 and Walsh codes of length 32. The length 16 Walsh codes are in a one-to-two correspondence with the length 32 Walsh codes. The length 32 Walsh codes are arranged in the same order as in the Walsh code list illustrated in FIG. 3.

The Walsh space bitmap of the WAICH indicates the availability of each Walsh code of length 16 corresponding to each two Walsh codes of length 32. Therefore, if a Walsh code of length 16 is 1, the receiver considers that two Walsh codes of length 32 corresponding to the Walsh code of length 16 are available to the PDCH.

Figure 12:
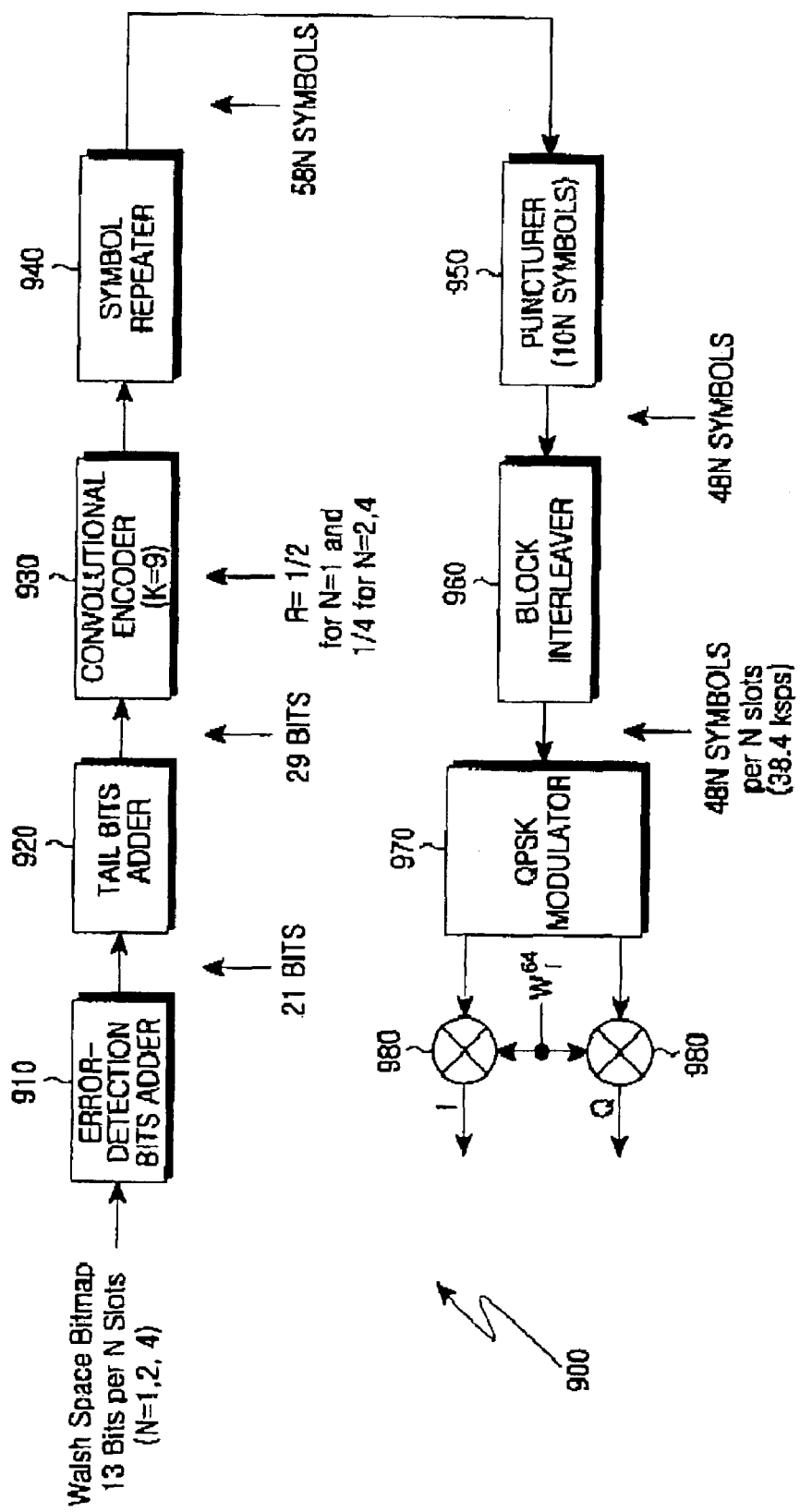
FIG. 12 is a block diagram of a WAICH transmitter according to the second embodiment of the present invention.

FIG. 12 is a block diagram of a WAICH transmitter 900 according to the second embodiment of the present invention. Referring to FIG. 12, an error detection bits adder 910 adds error detection bits, for example, an 8-bit CRC to a 13-bit input sequence representing a Walsh space bitmap to detect transmission errors in the input sequence.

A tail bits adder 920 adds tail bits to the 21-bit CRC-added sequence, for convergence to a predetermined state. The tail bits are 8 zeroes for convolutional encoding. A convolutional encoder 930 encodes the 29-bit information received from the tail bits adder 920 at a predetermined coding rate R. The coding rate R is determined according to the number N of slots that transmit the control information on the WAICH. if N=1, the convolutional encoder 930 outputs two symbols for the input of every one bit (R=½). If N=2 or 4, the convolutional encoder 930 outputs four symbols for the input of every one bit (R=¼).

A symbol repeater 940, if N=4, repeats the convolutional code symbols one time (repetition factor=2). As a result, the symbol repeater 940 outputs 58N symbols.

A symbol puncturer 950 punctures 10N symbols in the repeater output according to a puncturing pattern that minimizes performance degradation and matches to an appropriate data rate. An interleaver 960 interleaves the punctured symbols according to a predetermined interleaving rule and outputs 48N symbols per N slots to reduce the influence of burst errors that degrade coding performance. The interleaver 960 can be a BRI, i.e., a kind of a block encoder.

A modulator 970 modulates the interleaved symbols in a predetermined modulation scheme such as QPSK. Spreaders 980 spread I-channel modulated symbols and Q-channel modulated symbols with a spreading code $W_i^{64}$ assigned to the WAICH. The spread signals are transmitted to an MS.

Figure 13:
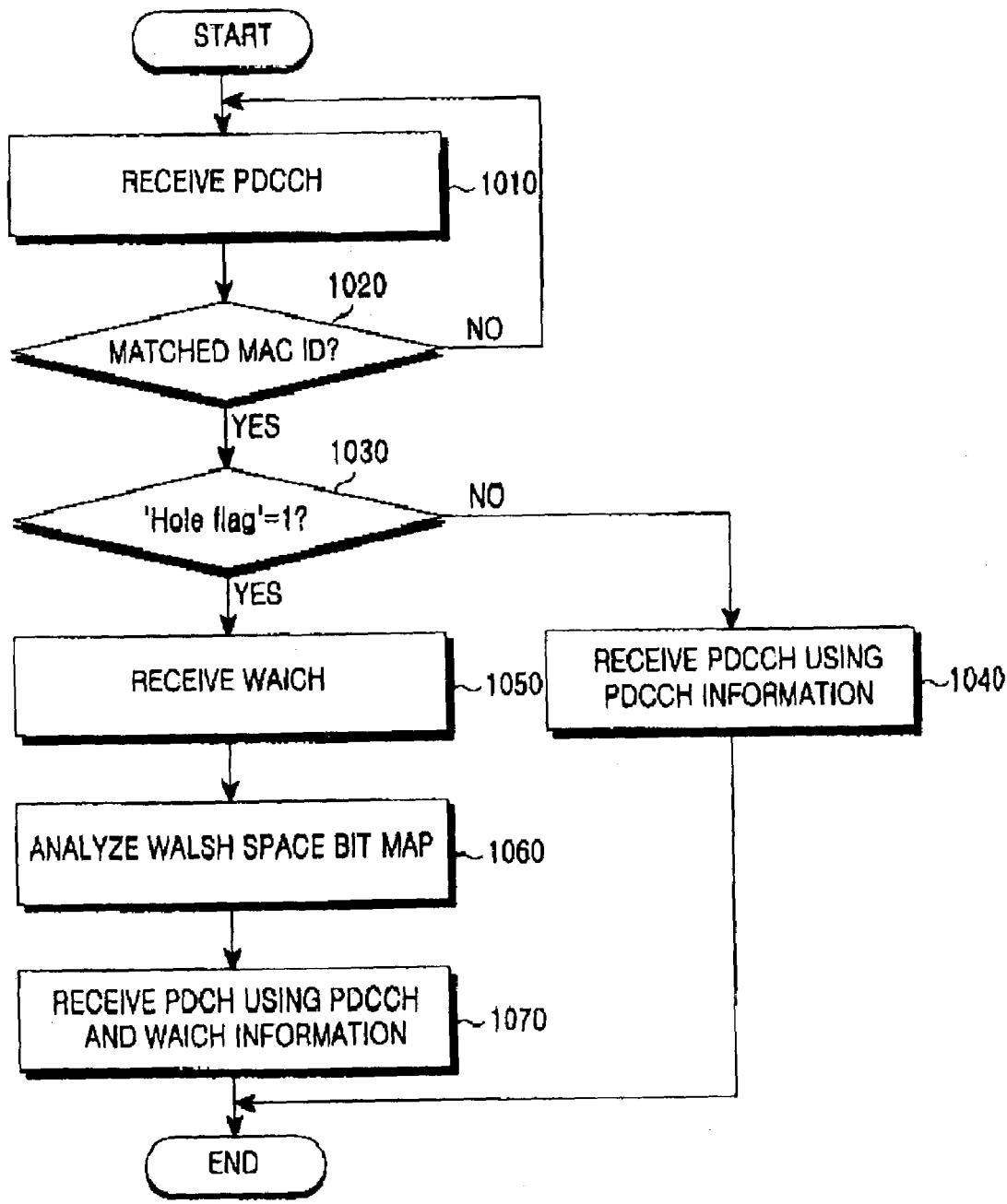
FIG. 13 is a flowchart illustrating an operation for receiving Walsh code information in the MS according to the second embodiment of the present invention.

FIG. 13 is a flowchart illustrating an operation in an MS for receiving Wash code information of the PDCH on a PDCCH and the WAICH according to the second embodiment of the present invention. Referring to FIG. 13, the MS receives control information on the PDCCH in step 1010. The control information contains the last Walsh code index available to the PDCH in a Walsh code list preset between a BS and the MS. In step 1020, the MS checks a MAC ID in the control information to determine whether the PDCH has a packet destined for the MS. If the MAC ID does not match the MS's MAC ID, the MS returns to step 1010.

If the MAC IDs are identical, the MS reads a hole flag from the PDCCH in step 1030. If the hole flag is 0, the MS determines that a Walsh hole is absent and Walsh code information about the PDCH can be obtained from the control information. Therefore, the MS acquires the Walsh code information using the last Walsh code index included in the control information and receives the PDCH using the Walsh code information in step 1040.

If the hole flag is 1, the MS determines that a Walsh hole is present and a Walsh space bitmap is to be received on a WAICH. Thus, the MS receives the Walsh space bitmap by demodulating the WAICH to the same length as that of the control information in step 1050. In step 1060, the MS reads each bit of the Walsh space bitmap and determines the availability of each of corresponding Walsh codes of length 16. That is, the MS detects the Walsh hole. The MS then acquires the Walsh code information about the PDCH by combining the last Walsh code index and the Walsh space bitmap and receives the PCH using the Walsh code information in step 1070. The Walsh code information is used to despread the PDCH.

For example, if the last Walsh code index obtained from the control information indicates a length 32 Walsh code #26 in FIG. 4, the MS determines that Walsh codes #31, 15, 23, 7, 27, 11, 19, 3, 29, 13, 21, 5, 25, 9, 30, 14, 22, 6, and 26 are available to the PDCH, not including Walsh codes #31, 15, and 23, which are in use for a common channel. And if the Walsh space bitmap obtained from the WAICH is 0000 1111 1111 1, the eight Walsh codes #31, 15, 23, 7, 27, 11, 19, and 3 are unavailable and the other Walsh codes #29, 13, 21, 5, 25, 9, 30, 14, 22, 6, and 26 are available.

Figure 14:
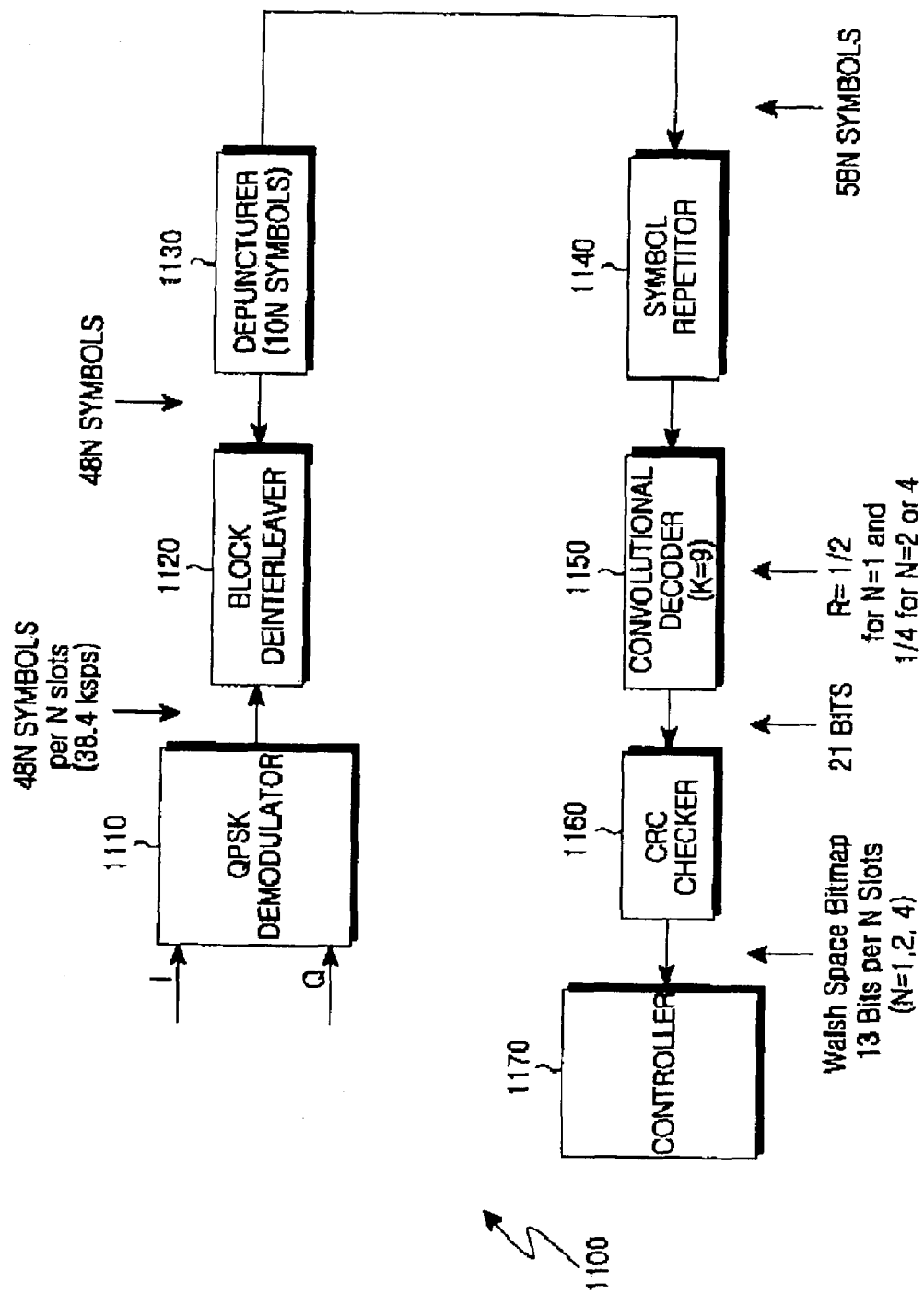
FIG. 14 is a block diagram of a WAICH receiver according to the second embodiment of the present invention.

FIG. 14 is a block diagram of a WAICH receiver 1100 corresponding to the WAICH transmitter 900 illustrated in FIG. 12 according to the second embodiment of the present invention. The length of a Walsh space bitmap received on a WAICH is equal to that of control information received on a PDCCH.

Referring to FIG. 14, a QPSK demodulator 1110 demodulates despread I and Q signals with a spreading code assigned to the WAICH and outputs 48N symbols. A deinterleaver 1120 deinterleaves the 48N symbols according to the slot length N of the control information received on the PDCCH. A depuncturer 1130 depunctures 10N symbols in the deinterleaver output. For 4-slot control information, a symbol combiner 1140 combines every two consecutive symbols in the depuncturer output.

A convolutional decoder 1150 decodes the depunctured symbols and the combined symbols at a corresponding coding rate. For 1-slot control information, R is ½, and for 2- or 4-slot control information, R is ¼.

A CRC checker 1160 checks the CRC of the decoded data. If no errors are detected, the CRC checker 1160 outputs a 13-bit Walsh space bitmap. A controller 1170 determines Walsh codes used for the PDCH using the Walsh space bitmap and the control information received on the PDCCH.

In accordance with the present invention as described above, accurate transmission of Walsh code information about a PDCH improves the performance of the PDCH, that is, system throughput.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of transmitting information about spreading codes used for a packet data channel (PDCH) in a spread spectrum communication system supporting a packet data service, comprising the steps of:

determining spreading codes available for the PDCH in a spreading code list;

transmitting on a first control channel first control information including an index of a last of the determined spreading codes;

determining whether the determined spreading codes can be represented by the last spreading code index only; and transmitting on a second control channel second control information including a spreading code bitmap indicating the availability of the spreading codes individually, if the determined spreading codes cannot be represented by the last spreading code index only.

2. The method of claim 1, wherein the spreading code list includes spreading codes arranged in a predetermined order.

3. The method of claim 1, wherein the spreading codes are walsh codes.

4. The method of claim 1, further comprising the step of judging that the determined spreading codes cannot be represented by the last spreading code index only, when a hole exists in the determined spreading codes.

5. The method of claim 1, wherein the first control information further includes a user identifier (ID) for identifying a user to which the PDCH is assigned and transmission parameters required for reception of the PDCH.

6. The method of claim 1, wherein the second control information further includes a user ID set to a selected value.

7. The method of claim 6, wherein the user ID is set to a value indicating whether the determined spreading codes can be represented by the last spreading code index only.

8. The method of claim 6, wherein the user ID is set to a value identifying a user to which the PDCH is assigned and transmission parameters required for reception of the PDCH.

9. An apparatus for transmitting information about spreading codes used for a packet data channel (PDCH) in a spread spectrum communication system supporting a packet data service, comprising:

a first control channel transmitter for determining spreading codes available for the PDCH in a spreading code list, and transmitting on a first control channel first control information including the an index of the a last of the determined spreading codes; and a second control channel transmitter for transmitting on a second control channel second control information including a spreading code bitmap indicating the availability of the spreading codes individually, if the determined spreading codes cannot be represented by the last spreading code index only.

10. The apparatus of claim 9, wherein the spreading code list includes spreading codes arranged in a predetermined order.

11. The apparatus of claim 9, wherein the spreading codes are walsh codes.

12. The apparatus of claim 9, wherein the second control channel transmitter judges that the determined spreading codes cannot be represented by the last spreading code index only, when a hole exists in the determined spreading codes.

13. The apparatus of claim 9, wherein the first control information further includes a user identifier (ID) for identifying a user to which the PDCH is assigned and transmission parameters required for reception of the PDCH.

14. The apparatus of claim 9, wherein the second control information further includes a user ID set to a selected value.

15. The apparatus of claim 14, wherein the user ID is set to a value indicating whether the determined spreading codes can be represented by the last spreading code index only.

16. The apparatus of claim 14, wherein the user ID is set to a value identifying a user to which the PDCH is assigned and transmission parameters required for reception of the PDCH.

17. A method of receiving information about spreading codes used for a packet data channel (PDCH) in a spread spectrum communication system supporting a packet data service, comprising the steps of:
receiving first control information on a first control channel and checking a user identifier (ID) included in the first control information;
acquiring from the first control information an index of a last spreading code available for the PDCH in a spreading code list, if the user ID is identical to an ID of a user that receives the first control information;
receiving second control information on a second control channel and checking a user ID included in the second control information;
acquiring from the second control information a spreading code bitmap indicating available spreading codes individually, if the user ID is identical to a selected value; and
determining the available spreading codes using the last spreading code index and the spreading code bitmap.

18. The method of claim 17, wherein the spreading code list includes spreading codes arranged in a predetermined order.

19. The method of claim 17, wherein the spreading codes are walsh codes.

20. The method of claim 17, further comprising the step of determining the available spreading codes using the last spreading code index if the user ID included in the second control information is different from the selected value.

21. The method of claim 20, wherein the selected value indicates whether the available spreading codes can be represented by the last spreading code index only.

22. The method of claim 20, wherein the selected value indicates the user that receives the first control information.

23. An apparatus for receiving information about spreading codes used for a packet data channel (PDCH) in a spread spectrum communication system supporting a packet data service, comprising:
a first control channel receiver for receiving first control information on a first control channel and checking a user identifier (ID) included in the first control information, and if the user ID is identical to an ID of a user that receives the first control information, acquiring from the first control information an index of a last spreading code available for the PDCH in a spreading code list;
a second control channel receiver for receiving second control information on a second control channel, checking a user ID included in the second control information, and if the user ID is identical to a selected value, acquiring from the second control information a spreading code bitmap indicating available spreading codes of the PDCH individually; and
a controller for determining the available spreading codes using the last spreading code index and the spreading code bitmap.

24. The apparatus of claim 23, wherein the spreading code list includes spreading codes arranged in a predetermined order.

25. The apparatus of claim 23, wherein the spreading codes are walsh codes.

26. The apparatus of claim 23, wherein the controller determines the available spreading codes using the last spreading code index if the user ID included in the second control information is different from the selected value.

27. The apparatus of claim 26, wherein the selected value indicates whether the available spreading codes can be represented by the last spreading code index only.

28. The apparatus of claim 26, wherein the selected value indicates the user that receives the first control information.

29. A method of transmitting information about spreading codes used for a packet data channel (PDCH) in a spread spectrum communication system supporting a packet data service, comprising the steps of:
determining spreading codes available for the PDCH in a spreading code list including spreading codes arranged in a predetermined order;
determining whether the determined spreading codes can be represented by an index of a last of the determined spreading codes only;
transmitting on a first control channel first control information including the last spreading code index and a flag indicating whether the determined spreading codes can be represented by the last spreading code index only; and
transmitting on a second control channel second control information including a spreading code bitmap indicating the availability of the spreading codes individually if the determined spreading codes cannot be represented by the last spreading code index only.

30. The method of claim 29, wherein the spreading code list includes spreading codes arranged in a predetermined order.

31. The method of claim 29, wherein the spreading codes are walsh codes.

32. The method of claim 29, further comprising the step of judging that the determined spreading codes cannot be represented by the last spreading code index only, when a hole exists in the determined spreading codes.

33. The method of claim 29, wherein the first control information further includes a user identifier (ID) for identifying a user to which the PDCH is assigned and transmission parameters required for reception of the PDCH.

34. An apparatus for transmitting information about spreading codes used for a packet data channel (PDCH) in a spread spectrum communication system supporting a packet data service, comprising:
a first control channel transmitter for determining spreading codes available for the PDCH in a spreading code list, and transmitting on a first control channel first control information including an index of a last of the determined spreading codes and a flag indicating whether the determined spreading codes can be represented by the last spreading code index only; and
a second control channel transmitter for transmitting on a second control channel second control information including a spreading code bitmap indicating the availability of the spreading codes individually, if the determined spreading codes cannot be represented by the last spreading code index only.

35. The apparatus of claim 34, wherein the spreading code list includes spreading codes arranged in a predetermined order.

36. The apparatus of claim 34, wherein the spreading codes are walsh codes.

37. The apparatus of claim 34, wherein the first control channel transmitter judges that the determined spreading codes cannot be represented by the last spreading code index only, when a hole exists in the determined spreading codes.

38. The apparatus of claim 34, wherein the first control information further includes a user identifier (ID) for identifying a user to which the PDCH is assigned and transmission parameters required for reception of the PDCH.

39. A method of receiving information about spreading codes used for a packet data channel (PDCH) in a spread spectrum communication system supporting a packet data service, comprising the steps of:
   receiving first control information on a first control channel and checking a user identifier (ID) included in the first control information;
   acquiring from the first control information an index of a last spreading code available for the PDCH in a spreading code list, if the user ID is identical to an ID of a user that receives the first control information;
   checking a flag included in the first control information to determine whether spreading codes available for the PDCH can be represented by the last spreading code index only;
   receiving second control information on a second control channel and acquiring from the second control information a spreading code bitmap indicating the available spreading codes individually, if the flag indicates that the available spreading codes cannot be represented by the last spreading code index only; and
   determining the available spreading codes using the last spreading code index and the spreading code bitmap.

40. The method of claim 39, wherein the spreading code list includes spreading codes arranged in a predetermined order.

41. The method of claim 39, wherein the spreading codes are walsh codes.

42. The method of claim 39, further comprising the step of determining the available spreading codes using the last spreading code index if the flag indicates that the available spreading codes can be represented by the last spreading code index only.

43. An apparatus for receiving information about spreading codes used for a packet data channel (PDCH) in a spread spectrum communication system supporting a packet data service, comprising:
   a first control channel receiver for receiving first control information on a first control channel and acquiring from the first control information an index of a last spreading code available for the PDCH in a spreading code list, and a flag indicating whether available spreading codes for the PDCH can be represented by the last spreading code index only;
   a second control channel receiver for receiving second control information on a second control channel and acquiring from the second control information a spreading code bitmap indicating the available spreading codes, if the flag indicates that the available spreading codes cannot be represented by the last spreading code index only; and
   a controller for determining the available spreading codes using the last spreading code index and the spreading code bitmap.

44. The apparatus of claim 43, wherein the spreading code list includes spreading codes arranged in a predetermined order.

45. The apparatus of claim 43, wherein the spreading codes are walsh codes.

46. The apparatus of claim 43, wherein the controller determines the available spreading codes using the last spreading code index if the flag indicates that the available spreading codes can be represented by the last spreading code index only.

* * * * *